Dec. 8, 1964   M. D. DE MONG   3,160,820
HIGH STABILITY PULSE SIGNAL AMPLIFIER WITH INVERSE FEEDBACK
Filed March 22, 1957
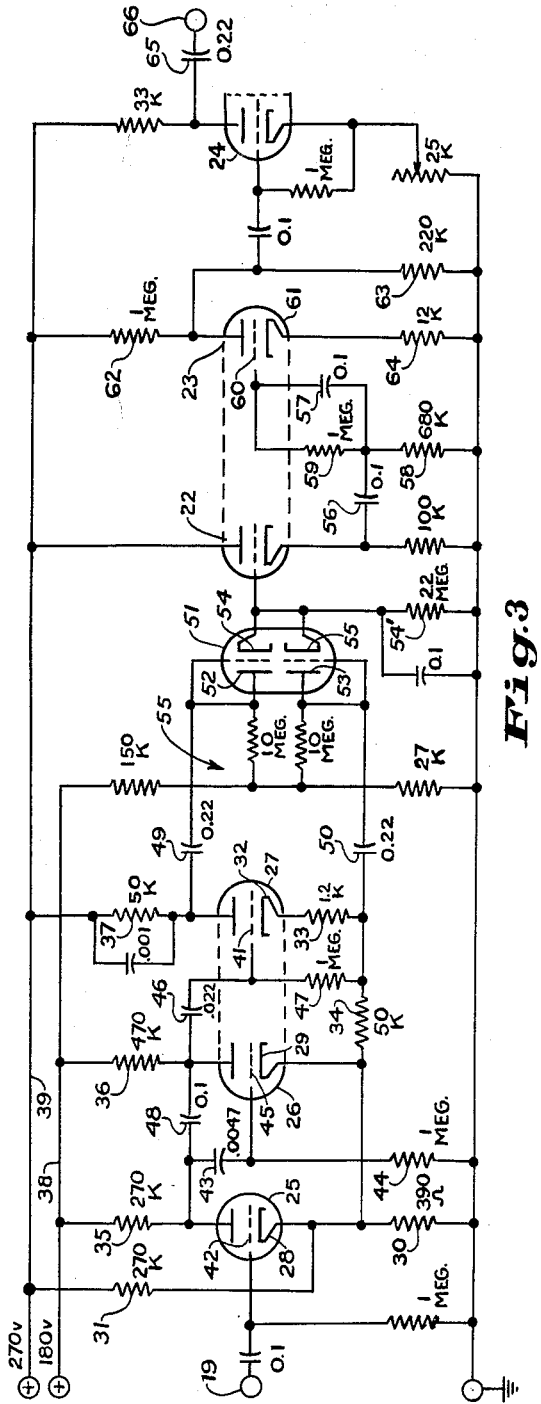
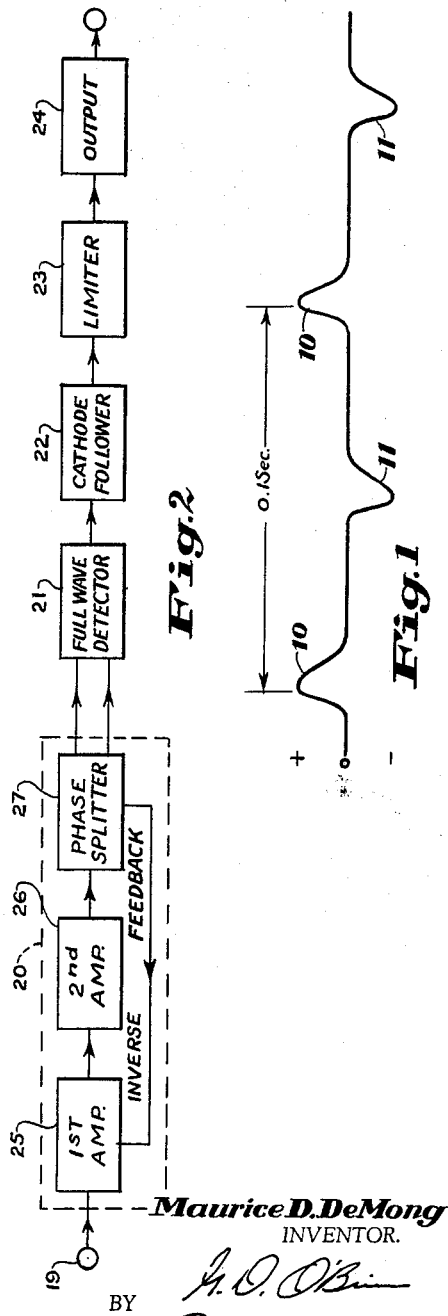
Maurice D. DeMong
INVENTOR.
BY
ATTORNEYS

United States Patent Office 3,160,820
Patented Dec. 8, 1964

3,160,820
HIGH STABILITY PULSE SIGNAL AMPLIFIER
WITH INVERSE FEEDBACK
Maurice D. De Mong, Torrance, Calif., assignor, by mesne assignments, to the United States of America as represented by the Secretary of the Navy
Filed Mar. 22, 1957, Ser. No. 647,928
2 Claims. (Cl. 328—120)

This invention relates to an improved pulse signal amplifier and especially to such an amplifier for use in the guidance control system of a guided missile.

In certain types of guided missiles guidance is controlled by means of a radiant-energy-responsive sighting unit carried on the missile itself. In one such type of guidance system the sighting unit is adapted, when properly aligned with the target, to generate two series of output pulses or signals, one series indicative of UP-DOWN alignment and the other of LEFT-RIGHT alignment of the sighting axis. Each series of pulses comprises pairs of alternate positive-going and negative-going pulses occurring at a relatively low repetition rate of about 10 cycles per second. Absence of either pulse in a series is indicative of misalignment of the sighting axis in the corresponding plane and is utilized to initiate corrective movement of the sighting unit to realign the sighting axis with the target.

The strength of the individual pulses, even when the sighting axis is properly aligned, may vary over extremely wide limits depending upon such factors as the distance to, and the nature of the target. In order to utilize these pulses for their desired purpose it is necessary that the weakest useable pulses be amplified up to a sufficiently high level to insure proper operation of the correction apparatus, without overloading of either the amplifier or the correction apparatus on the strongest pulses, and while discriminating against unwanted signals such as stray electrical "noise" etc.

It is an object of this invention to provide such an amplifier, which not only attains these results most effectively but which uses relatively few components, and is extremely tolerant of normal variations in the characteristics of the individual components.

Further objects will become apparent from the following specification and claims, especially when considered in the light of the accompanying drawings wherein:

FIG. 1 is a diagrammatic representation of the type of signals to be handled by my improved amplifier.

FIG. 2 is a block diagram of an amplifier embodying my invention.

FIG. 3 is a schematic diagram of the amplifier of FIG. 2.

Considering first FIG. 1, a pulse series of the type which is representative of the signals to be handled by my improved pulse amplifier, is diagrammatically illustrated. As shown this pulse series normally consists (when the sighting axis is correctly oriented in that particular plane) of alternate positive-going and negative-going pulses 10 and 11, each pair of pulses being repeated at one-tenth-second intervals.

It is desired to amplify these pulses to a quite considerable extent and to rectify or invert alternate pulses so that they are all of the same polarity. Where the amplifier is to be utilized in a missile guidance system of the type previously described it is important to sense the absence of either the positive-going or negative-going pulses. Analysis of the pulse series will show that it consists of a fundamental component of 10 cycles per second together with higher harmonics thereof, and it should be noted that the fundamental 10 cycle component will be present even though one or the other of the positive- or negative-going series of pulses is absent.

Thus, it is desirable that the response of the associated amplifier be fairly highly attenuated at this basic 10 cycle frequency to avoid a false "on course" signal even though one type of pulses is missing. Moreover to avoid "overshoot" on rapidly rising, strong signals, as well as to differentiate against stray electrical "noise" it is desirable that the response curve of the amplifier drop off quite rapidly in the vicinity of 100 cycles per second.

The amplifier described herebelow attains these results while still maintaining a high degree of stability in the intermediate range of frequencies between these limits.

As shown in block-diagram form in FIG. 2 the signal amplifier comprises a three-stage inverse feedback amplifier 20, the last stage of which provides balanced or push-pull output, a full-wave detector 21 responsive to the output of said feedback amplifier, a cathode follower 22 for applying the output of the detector to a variable threshold clipper or limiter 23 which in turn drives a low gain output stage 24.

The feedback amplifier 20 comprises three triodes 25, 26 and 27 connected in cascade and with a relatively high degree of overall inverse feedback. The cathodes 28 and 29 of triodes 25 and 26 are connected to ground, which constitutes the negative side of a suitable D.C. power supply (not shown) used with the amplifier, through a common cathode resistor 30, which is shown as the lower portion of a voltage divider across the power supply the upper portion being constituted by the relatively high resistance 31. The cathode 32 of triode 27 is connected to the cathodes 28 and 29 by a pair of individual resistors 33 and 34 the junction of which constitutes one output terminal of the feedback amplifier. Anode resistors 35, 36 and 37 are connected between the respective anodes of the triodes 25, 26 and 27 and suitable positive supply lines 38, 39, the other output from the feedback amplifier being taken from the anode of triode 27. Resistors 34 and 37 are of similar value, so that variations in anode current in tube 27 as a result of signals applied to the grid 41 thereof will produce substantially equal but opposite changes in the potential at the two output terminals of this stage whereby balanced, or push-pull input signals may be applied to the following detector stage. In an actual amplifier built in accordance with my invention and which utilized the circuitry shown in FIG. 3, balance of these signals was improved by shunting resistor 37 with a relatively low value (.001 mfd.) capacitor as clearly shown in the drawing. Such capacitor serves to balance the stray capacities effectively shunting resistor 34.

Input pulses applied to the grid 42 of triode 25 and amplified thereby are coupled by the R-C network formed by coupling capacitor 43 and grid resistor 44 to the grid 45 of triode 26. The resulting output pulses at the anode of triode 26 are similarly coupled by the R-C network formed by coupling capacitor 46 and grid resistor 47 to the grid 41 of phase splitter 27.

Multi-stage negative feedback amplifiers having appreciable overall gain have a tendency to become unstable both at the higher and lower ends of their useful frequency spectrum. In order to prevent such instability at the higher frequencies, as well as to reduce the unwanted effects of stray electrical "noise" it is therefore desirable to decrease the high frequency response. This could be done, for example, by connecting a relatively large capacitor from the anode of triode 26 to ground. However applicant has found that this result can be attained with the use of a much smaller capacitor 48 of considerably lower voltage rating connected directly between the anodes of the first two stages 25 and 26.

Stability in the low frequency region as well as attenuation of the unwanted 10-cycle sine wave component of the input signals is attained by proper proportioning of the coupling capacitors 43 and 46 relative to one another. As will be noted from FIG. 3 coupling networks formed by capacitors 43 and 46 and their associated resistors 44 and 47 effectively constitute high pass filters which tend to attenuate the response of the amplifier to the lower frequencies. Moreover, by using a considerably larger value of capacitor at 46 than at 43 the tendency, which would otherwise obtain, for unwanted oscillation or appreciable resonance effects to occur at these low frequencies is effectively suppressed.

The two balanced outputs from the phase splitter 27 of the feedback amplifier 20 are applied through coupling capacitors 49 and 50 to the full wave detector 21 shown as a duo-triode 51 having the grid and plate of each section tied together to serve as anodes 52 and 53, and with the cathodes 54 and 55 of both sections directly connected together and to a load resistor 54. As described in detail in my copending application Ser. No. 647,930, now Patent No. 2,912,584, entitled "Full Wave Detector" this detector is provided with a voltage dividing network 55 for applying a predetermined positive bias to each anode, so that current will be flowing through one or both sections of the diode at all times, even in the absence of any input signal. As explained in detail in said copending application, this arrangement renders the detector responsive to extremely weak input signals. With the arrangement shown both the positive-and negative-going signal pulses applied to the input of feedback amplifier 20 will appear as amplified positive-going pulses at the cathode end of detector load resistor 54'.

These output pulses are applied directly to the grid of cathode follower 22, the output of which is coupled through the R-C coupling network formed by capacitors 56 and 57 and the resistors 58 and 59 to the grid 60 of the variable threshold clipper 23.

Up to this point signals appearing at the input of the feedback amplifier and falling within the passband thereof will have all been amplified substantially the same amount regardless of their original amplitude. As previously indicated they may vary in amplitude over a very wide range, depending upon such factors as the distance to and the nature of the target being tracked. However it is the presence or absence of signal pulses, not their amplitude that determines whether proper guidance is being obtained and the guidance correcting system is therefore arranged to respond to this condition, rather than to the amplitude.

The overall gain therefore need only be sufficient to amplify the weakest signal pulses that it is desired to utilize, up to a level where positive control can be obtained. In fact, to avoid overloading and consequent malfunction of the guidance system, the level of the output signals from the signal amplifier should not greatly exceed this safe operating level. It is therefore necessary that the dynamic range of the output signals be considerably smaller than that of the input signals, and to obtain this result some kind of automatic gain control is required. The conventional automatic gain control circuits are not appropriate for this use in a guidance system due to their inherently slow response and recovery rates. However the variable threshold clipper or limiter 23 utilized in this invention performs this function most effectively.

As shown in the schematic diagram this clipper comprises a triode 61, with its anode voltage obtained from a voltage divider formed by resistors 62 and 63 whereby to limit the anode voltage to a relatively low level. An un-bypassed cathode resistor 64 serves to normally bias the stage for class A operation when the signals appearing at the output of cathode follower 22 are at a relatively low level. However, stronger signals will cause triode 61 to begin to draw grid current through resistors 58 and 59 causing condenser 57 to acquire a negative charge thereby increasing the bias on the grid 61. This will clip the lower portion of the signal so that on the strongest signals where the bias is maximum only the extreme peaks will be permitted to pass. At the same time the maximum output signal will be limited by the relatively low anode voltage. Thus the dynamic range of amplitude of the output signals from limiter 23 will be much smaller than that of the signals appearing at the input.

The network between cathode follower 22 and limiter 23 also performs an additional function. Under centain conditions, for example where a relatively large target is being tracked at moderately close range the input signal to the amplifier tends to become distorted so that either the positive or negative pulse takes on a double-humped characteristic. Since the signals will be relatively strong under these circumstances condenser 57 will become charged on the first hump of such a distorted pulse. The time constant of condenser 57 and resistor 59 is sufficiently long that the grid 60 will still be biased negatively at the arrival of the second hump and as a result the amplitude of this second hump at the output of the limiter will be considerably lower than and will tend to blend in to the first hump, with the desirable result that but one effective output pulse will occur even though the input pulse is thus distorted.

Output stage 24 is a relatively low gain stage whose primary function is to provide a proper impedance match for the following control apparatus (not shown) which will normally be connected to the amplifier output terminal 66 to which the output of the signal amplifier is applied through coupling capacitor 65.

Operation of the invention is believed to have been made clear in conjunction with the above specific description of the invention. Pulse signals applied to the input 19 of the signal amplifier are first amplified in triodes 25 and 26 and then passed through the phase splitter 27 to provide a pair of balanced output signals 180° out of phase with one another. These balanced signals are then detected by the full wave detector 21 wherein they are all converted to positive-going pulses which are passed by way of the impedance matching cathode follower 22 to the variable gain clipping amplifier or limiter 23 which serves to amplify the weaker signals to a much greater extent than the stronger signals. From the output of the limiter the signals pass to the low gain output stage 24 and thence to the output terminal 66. Due to the relatively high degree of inverse feedback utilized, particularly in amplifier 20, the unit is tolerant of relatively wide variations in the characteristics of most of the components, including the vacuum tubes.

While obviously the exact values of the various components will vary depending upon the desired frequency pass band, tubes used, etc., the values shown beside each component on the schematic diagram, FIG. 3, have been found most satisfactory for the specific conditions chosen for purposes of illustration. In this specific embodiment tube 25 is a type 5719, while all other stages are constituted by one or both sections of type 6112 tubes.

As will be readily understood by those skilled in the art, many changes can be made in the specific details of the signal amplifier without departing from the spirit and scope of the invention as defined by the appended claims.

I claim:

1. A multi-stage pulse amplifier comprising first, second, and third triodes each having an anode, a cathode and a control grid, means including individual anode resistors for connecting the anode of each triode to a suitable source of positive voltage, a common cathode resistor for connecting the cathodes of said first and second triodes to the negative side of said source, means including a second cathode resistor connecting the cathodes of said first and second triodes to the cathode of said third triode, a first resistance-capacity coupling network connecting the anode of said first triode to the grid of said second triode, a second resistance-capacity coupling network connecting the anode of said second stage to the grid of said third stage, means for applying input pulses to the grid of said first triode, said second cathode resistor and the anode resistor of said third triode being of substantially similar resistance whereby each input pulse applied to said first triode will produce a pair of output pulses of opposite phase to one another across said last-mentioned resistors, a capacitor being connected directly between the anodes of said first and second triodes whereby to attenuate the high frequency response of said amplifier, and said coupling networks each having a relatively short time constant, but with the time constant of said second coupling network being considerable greater than that of said first coupling network.

2. A signal amplifier for pairs of input pulses of opposite polarity and of relatively low repetition rate comprising a three-stage amplifier the last stage of which constitutes a phase-splitter, adapted to provide a pair of balanced output signals in phase opposition to one another in response to a pulse applied to the input of said amplifier, said amplifier having relatively high overall inverse feedback and including first and second stages including triodes having anodes furnishing output terminals for said stages, a capacitor directly interconnecting the anodes of the first and second stages whereby to attenuate the high frequency output of said amplifier, a full-wave detector responsive to the balanced output signals from said phase splitter to provide unidirectional pulses in response to said input pulses, and a variable threshold clipper amplifier including biassing means responsive to the amplitude of said unidirectional pulses applied thereto to vary the clipping level thereof in accordance with such amplitude whereby to effectively compress the dynamic range of the resulting amplified pulses appearing at the output of said clipper amplifier.

References Cited in the file of this patent
UNITED STATES PATENTS
2,559,515     Pourciau _____ July 3, 1951